Patented Oct. 27, 1925.

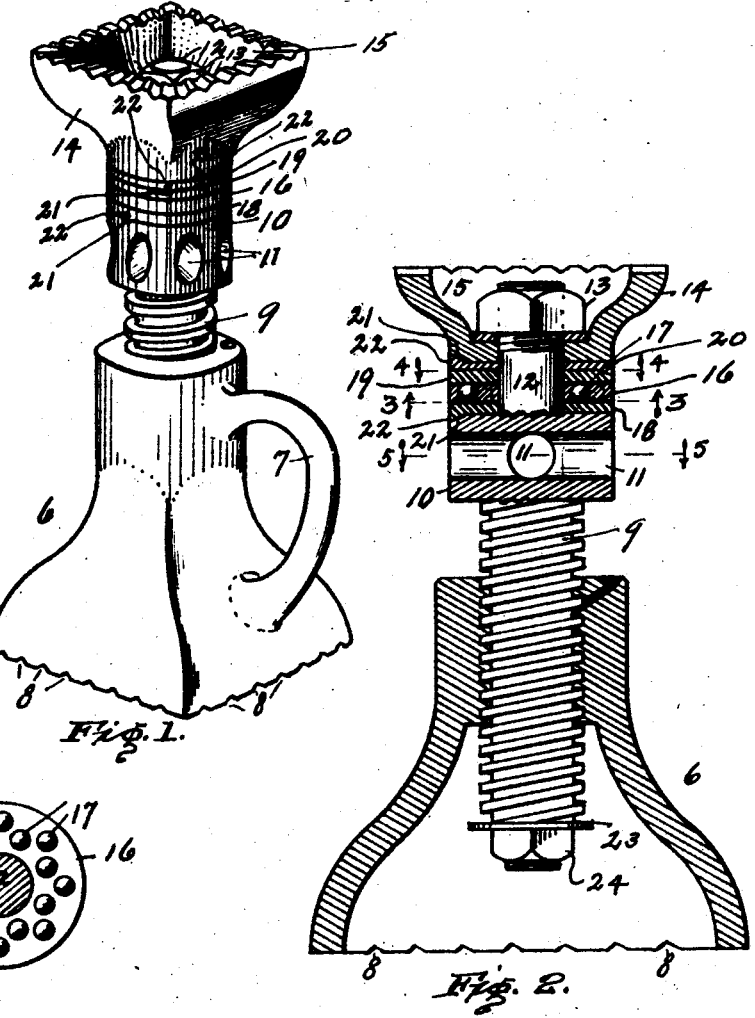

1,559,045

UNITED STATES PATENT OFFICE.

ROBERT C. McCOLLEY, OF INDIANAPOLIS, INDIANA.

LIFTING JACK.

Application filed March 9, 1925. Serial No. 14,077.

*To all whom it may concern:*

Be it known that I, ROBERT C. MCCOLLEY, a citizen of the United States, residing at Indianapolis, in the county of Marion and State of Indiana, have invented a new and useful Improvement in Lifting Jacks, of which the following is a specification.

This invention relates to improvements in lifting jacks and particularly those for heavy lifting, pulling and pushing, having a head swivelly attached to the outer end of a screw.

The object of the invention is to provide ball bearings between the head and its bearing shoulder on the screw, to distribute the wear of the balls over the surface of flat bearing rings which are removable for renewal when too much worn.

A further object is to provide bearing rings of varying thickness, and also varying in number, thereby to regulate the extent to which the screw projects into the head so the end of the screw will always be below the bearing plane of the head thereby to keep the screw from contacting with the load or work and marring it.

A further object is so to lock the bearing rings to the head, and to the shoulder of the screw member, respectively, that there will be no travel and resulting friction and wear between contacting rings and between the rings and shoulder or head.

A still further object is to arrest the withdrawal of the screw from the base within such limits as will prevent damage to the screw which often occurs by running it out too far when ball-bearings are used in the jack and the object is so to construct the base and head that they will so grip the timbers that they bear against that the jack will not slip or rotate, particularly while being used for pushing or pulling.

I accomplish the above, and other objects which will appear hereafter, by the means illustrated in the accompanying drawing, in which—

Fig. 1, is a perspective view of my improved jack, Fig. 2, is a longitudinal central section of same, Fig. 3, is a cross section on the line 3—3, Fig. 4 a cross section on the line 4—4, and Fig. 5 a cross section on the line 5—5, of Fig. 2, looking in the respective directions of the arrows.

Like characters of reference indicate like parts in the several views of the drawing.

The base 6 is of cast iron or steel having a handle 7, and an expanded bottom which is preferably square in outline to provide a maximum length of straight outside corner to sink into a wooden beam or other support and prevent slippage of the jack. The bottom preferably has a series of notches 8 which produce teeth-like formations that also aid in holding a given position of the jack.

The base has the usual threaded hole, in which a screw 9 operates. The outer portion of the screw 9 has a cylindrical enlargement 10, which limits the insertion of the screw into base 6. It has a series of diametrical holes 11 for the insertion of an end of a hand lever, used for manually rotating the screw. Two holes extending diametrically through the cylindrical member at right angles to each other have been heretofore used, but I prefer to increase the number to three, as shown, to enable the lever to be changed from one hole to the next without requiring so long a reach as formerly.

Integral with the cylindrical member 10, and extending opposite to, and in alinement with the screw, is a stud 12, the outer end of which is screw-threaded to engage with a nut 13. Swivelly mounted on the stud is the jack-head 14, having a socket 15 in its outer face to so let the end of the stud and its retaining nut 13 well below the plane of the face of the jack-head that the stud will not contact with the load or work of the jack.

Between the jack-head and cylindrical member 10, is a disk 16, with a series of holes therethrough in which steel bearing balls 17 are assembled. Preferably the holes are staggered, or in two rows, as shown, to distribute the bearings over a wider surface.

The disk 16 is laid upon a flat metal ring 18 and above disk 16 is a similar ring 19. The rings 18 and 19 form bearing plates, below and above, for the balls 17, and, when all are assembled, with the jack-head, if the outer end of stud 12 projects too far through the head, the latter is raised by inserting another ring 20 (or more than one if needed) under the head or above the member 10.

To prevent travel of rings 18, 19 and 20 independently of their respective jack-head or cylindrical member 10, thereby causing friction and wear between the rings, and to insure that all of the friction from the normal use of the jack is on the balls, I interlock the rings with each other and with their adjacent jack head or cylindrical member, as the case may be, by forming indents 21 in one of the members to be interlocked and a detent 22, to engage therewith, in the other.

As shown in the drawing, the indent is a notch made with a file, and the opposite metal of the adjacent piece is swaged into it with a punch, generally after an assembly has been made.

Not only is the way thus provided for keeping the end of the stud below the top or working plane of the jack-head, but a renewal of surfaces worn by the balls is made easy of accomplishment.

To prevent injury to the screw 9, caused by running it too far out due to much easier operation where ball-bearings are used, I provide a stop-plate 23, on the inner end of the screw, held by a nut 24. The outer, or work-contacting portion of the jack-head, is preferably square in outline like the lower end of the base, to keep the jack from slipping, in use, and it is preferably notched, as shown, as a further preventative.

While I have thus described my invention with much minuteness it is capable of many variations in construction and shape without departing from the spirit of the invention and I do not therefore desire to be limited to the precise device shown nor any more than is required by the subjoined claims.

I claim:

1. In a lifting-jack having a base and a head regulated in their distance apart by a screw projecting into the head, the combination with a plurality of spacing rings to regulate the projection of the screw into the head, of means to prevent the creeping of the rings.

2. The combination, with a lifting-jack having a base member and a head each with angular-cornered bearing portions connected by serrated edges, which head and base are separated by a screw projecting into the head, of a plurality of spacing rings surrounding the screw to regulate the projection of the screw into the head and means to prevent creeping comprising cooperating indents and detents in the bearing faces of said parts.

Signed at Indianapolis, county of Marion, State of Indiana, this the 6th day of March, 1925.

ROBERT C. McCOLLEY.